(12) United States Patent
Deolalikar et al.

(10) Patent No.: US 9,002,102 B2
(45) Date of Patent: Apr. 7, 2015

(54) GENERATING TRAINING DOCUMENTS

(71) Applicant: Hewlett-Packard Development Company, L.P., Houston, TX (US)

(72) Inventors: Vinay Deolalikar, Cupertino, CA (US); Hernan Laffitte, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 118 days.

(21) Appl. No.: 13/725,487

(22) Filed: Dec. 21, 2012

(65) Prior Publication Data

US 2014/0177948 A1    Jun. 26, 2014

(51) Int. Cl.
    *G06K 9/62*      (2006.01)

(52) U.S. Cl.
     CPC .................................. *G06K 9/6256* (2013.01)

(58) Field of Classification Search
     None
     See application file for complete search history.

(56) References Cited

U.S. PATENT DOCUMENTS

| | | | |
|---|---|---|---|
| 6,553,356 B1 | 4/2003 | Good et al. | |
| 7,418,123 B2 | 8/2008 | Giger et al. | |
| 2008/0281764 A1* | 11/2008 | Baxter | 706/12 |
| 2009/0307202 A1* | 12/2009 | Goerke et al. | 707/5 |
| 2009/0313194 A1* | 12/2009 | Amar et al. | 706/20 |
| 2010/0150448 A1* | 6/2010 | Lecerf et al. | 382/190 |
| 2010/0284623 A1* | 11/2010 | Chen et al. | 382/224 |
| 2011/0004573 A1* | 1/2011 | Chitiveli et al. | 706/12 |
| 2011/0047156 A1* | 2/2011 | Knight et al. | 707/737 |
| 2012/0163707 A1* | 6/2012 | Baker et al. | 382/159 |

FOREIGN PATENT DOCUMENTS

| | | | |
|---|---|---|---|
| EP | 1128278 A1 * | 8/2001 | |
| WO | WO 2009017464 A9 * | 3/2009 | |

OTHER PUBLICATIONS

Chen, R. et al.; "A Bayesian Network Classifier with Inverse Tree Structure for Voxelwise Magnetic Resonance Image Analysis"; 2005; pp. 4-12.
Hazen, T.J. et al.; "MCE Training Techniques for Topic Identification of Spoken Audio Documents"; Mar. 28, 2011; pp. 2451-2460; vol. 19; Issue 8.
King, B.R.; "Protein Sequence Classification with Bayesian Supervised and Semi-supervised Learned Classifiers"; 2008; http://www.eg.bucknell.edu/~brk009/assets/BRK_Thesis.pdf.

* cited by examiner

*Primary Examiner* — Jon Chang
(74) *Attorney, Agent, or Firm* — Van Cott, Bagley, Cornwall & McCarthy

(57) ABSTRACT

A method of generating training documents for training a classifying device comprises, with a processor, determining a number of sub-samples in a number of original documents, and creating a number of pseudo-documents from the sub-samples, the pseudo-documents comprising a portion of the number of sub-samples. A device for training a classifying device comprises a processor, and a memory communicatively coupled to the processor. The memory comprises a sampling module to, when executed by the processor, determine a number of sub-samples in a number of original documents, a pseudo-document creation module to, when executed by the processor, create a number of pseudo-documents from the sub-samples, the pseudo-documents comprising a portion of the number of sub-samples, and a training module to, when executed by the processor, train a classifying device to classify textual documents based on the pseudo-documents.

16 Claims, 13 Drawing Sheets

Fig. 13

GENERATING TRAINING DOCUMENTS

BACKGROUND

The amount of documents containing text has exponentially grown since the advent of computer networking. Individuals and business entities are disseminating more and more information in the form of textual documents via networks such as the Internet. These textual documents may be associated with a myriad of individual and corporate activities including, for example, the sale of goods and services, the reporting of news, and, in general, the sharing of ideas.

Classification of these textual documents by topic, for example, may assist in the archiving, retrieval, and dissemination of the textual documents. In this manner, an interested individual may obtain a copy of a number textual documents associated with a particular topic. However, classification of textual documents by, for example, their topic is extremely time consuming and cost-ineffective for an individual or business entity even with the assistance of a computing device.

BRIEF DESCRIPTION OF THE DRAWINGS

The accompanying drawings illustrate various examples of the principles described herein and are a part of the specification. The illustrated examples are given merely for illustration, and do not limit the scope of the claims.

FIG. 13 is a table depicting the performance of the Naïve Bayes, according to one example of the principles described herein.

Throughout the drawings, identical reference numbers designate similar, but not necessarily identical, elements.

DETAILED DESCRIPTION

Figure 1:
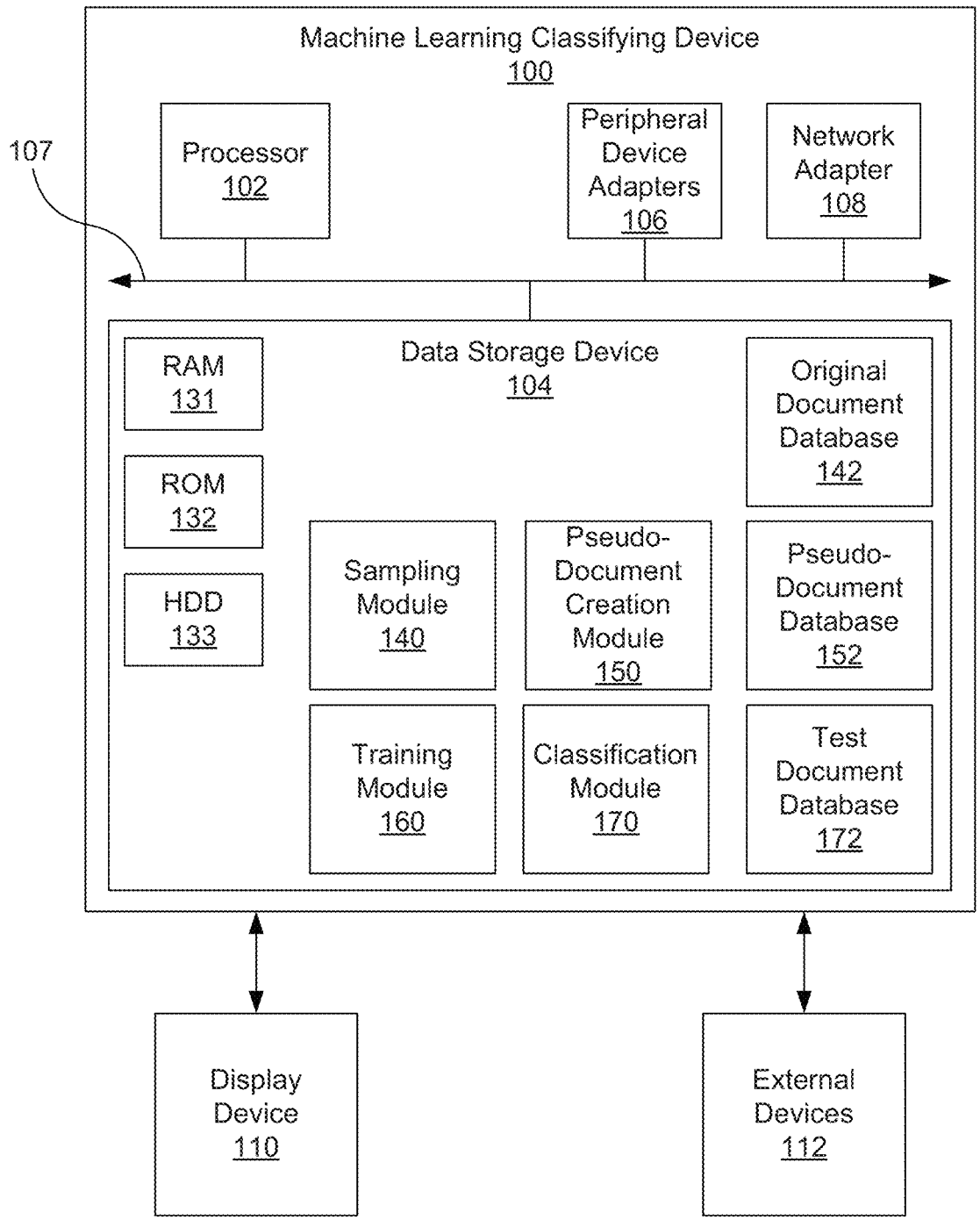
FIG. 1 is a block diagram of a machine learning classifying device for classifying textual documents, according to one example of the principles described herein.

The present systems and methods provide for the classification of textual documents. In some situations, a relatively limited number of test documents are available to a computing system to train the computing system to classify the textual documents. Without a sufficient number of training documents, the classification system may not be able to correctly classify documents as being relevant to, for example, a specific topic.

The present classification system samples a distribution of words within a number of original documents. The distribution of words is used to create pseudo-documents. The pseudo-documents comprise the same or similar distribution of words as a number of the original documents. These pseudo-documents are then used as test documents to train the computing system to classify textual documents.

More specifically, the present disclosure provide for a method of generating training documents for training a classifying device comprising, with a processor, determining a number of sub-samples in a number of original documents, and creating a number of pseudo-documents from the sub-samples, the pseudo-documents comprising a portion of the number of sub-samples. The present disclosure further provides for a device for training a classifying device, comprising a processor, and a memory communicatively coupled to the processor. The memory comprises a sampling module to, when executed by the processor, determine a number of sub-samples in a number of original documents, a pseudo-document creation module to, when executed by the processor, create a number of pseudo-documents from the sub-samples, the pseudo-documents comprising a portion of the number of sub-samples, and a training module to, when executed by the processor, train a classifying device to classify textual documents based on the pseudo-documents.

Still further, the present disclosure provides for a computer program product for classifying documents. The computer program product comprises a non-transitory computer readable medium comprising computer usable program code embodied therewith. The computer usable program code comprises computer usable program code to, when executed by a processor, determine a number of sub-samples in a number of original documents, computer usable program code to, when executed by a processor, create a number of pseudo-documents from the sub-samples, the pseudo-documents comprising a portion of the number of sub-samples, computer usable program code to, when executed by a processor, train a classifying device to classify textual documents based on the pseudo-documents, and computer usable program code to, when executed by a processor, classify a number of test documents.

Bayesian classifiers have advantages in enterprise applications: namely, their readily interpretable models, and, consequently, their ability to support diagnostics. Bayesian classifiers include Naïve Bayes classifier, which is based on the simplest unigram language model, as well as those based on more sophisticated language models.

Scarce training data is a pervasive problem in enterprise text classification. Therefore, improving the accuracy of Bayesian classifiers with little training data is an important practical problem. The present disclosure approaches this problem in two ways. First, the present disclosure proposes Jackknife Document Replication (JDR): a data-centric reuse scheme based on jackknife sub-sampling from statistics. Next, the present disclosure approaches the problem using a model-centric approach: specifically, using the smoothing parameter (in the MLE derivation) and the concentration parameter of the symmetric Dirichlet prior (in the MAP derivation). The present disclosure demonstrates that JDR, which is a data-centric approach, can be unified with the aforementioned model-centric approaches using a notion of adjointness. This adjointness, in one direction, gives a "cost-free implementation" of JDR, and in the other direction gives the optimal value of the additive smoothing parameter for scarce data.

Experiments with Naïve Bayes on a wide variety of benchmarks demonstrate that the present systems and methods make Naïve Bayes more accurate than support vector machines (SVM) for binary problems in the very scarce training data regime, as demonstrated below. In a great many real-world applications of text classification, training data is either prohibitively costly, or simply impossible to obtain. Through experience in working for a Fortune-50 IT major, the lack of adequate training data is a fundamental hurdle preventing the wider deployment of text classification technologies in the enterprise. Of the eight business units that requested classification technologies between 2008 and 2010, only one had more than 100 training samples for each target class. In a 32-class application from 2012, the number of training samples per class averaged less than 4, and the mode for the number of samples per sub-class was 2.

Of the many classifiers that have been proposed for the task of text classification, an effective classifier is the Naïve Bayes probabilistic classifier. The Naïve Bayes classifier has several advantages for enterprise applications: it is easy to implement, and can be trained fast. Further, an aspect of Naïve Bayes that makes it attractive for enterprise applications is that it is transparent, and can be used for diagnostics. A user can easily understand the classifier's model, and can therefore troubleshoot it. This is an important benefit since, in almost all enterprise classification applications, the user has an idea of some terms that should be associated with certain classes. In comparison, a solved model of a SVM is often hard to interpret. Enterprise business units are reluctant to adopt new technology that they cannot maintain and troubleshoot. This aspect of Naïve Bayes has not received enough attention in the research community.

However, Naïve Bayes may be less accurate on text classification than state of the art classifiers such as SVMs. Therefore, the present disclosure addresses the two questions of practical and theoretical importance in this paper. First, from a data-centric perspective, what can be done with scarce training data to enable more accurate classification from it? Second, from a model-centric perspective, how can the data independent parameters of the model be chosen to enable more accurate classification from scarce training data?

Given that the combination of Bayesian classification and very limited training data is of such practical importance in enterprise applications, it is surprising that there has been almost no research performed in this area. Existing methods to grapple with the paucity of training data are general, and may use semi-supervised learning where a classifier is trained with the little training data, and some amount of unlabelled data is labeled by the classifier, and then added to training data to relearn. Semi-supervised learning assumes that unlabelled data is abundant. This assumption is motivated largely by online sources of data; it does not hold in enterprise applications. Moreover, semi-supervised learning with Naïve Bayes and the expectation-maximization (EM) maximum a posteriori (MAP) estimates of parameters in statistical models makes assumptions. The assumptions are that the data is generated by a mixture model whose components correspond to classes—on the model, and generally harms accuracy when these are not met.

Thus, the present disclosure develops a unified approach to deal with the scarcity of training data that answers the above two questions. First, the present disclosure proposes Jackknife Document Replication (JDR): a data-centric technique that is based on well-established statistical jackknifing principles. Jackknifing generates new training data from existing training data by deleting subsets of the data. Jackknifing is used in statistics to generate more samples from a given sample, with the additional property that these are actual samples of the true distribution, not the empirical distribution. In this manner, a single, original text document can be treated as a sample from an underlying probabilistic process. Therefore, jackknife subsamples can be created from the single, original text document to generate more text documents (pseudo-documents) that are honest samples from the same underlying probabilistic process. These pseudo-documents augment the scarce training data. JDR requires no additional assumptions on the generative model of the text.

Next, the present disclosure approaches the problem from the model-centric direction of smoothing. The present disclosure determines how the value of the smoothing parameter can be set when data is scarce. Further, the present disclosure demonstrates that JDR is related to smoothing by a form of adjointness.

As used in the present specification and in the appended claims, the term "original documents" is meant to be understood broadly as any document provided to a classifying system or device that is used to assist in the training of the classifying system or device. These original documents may be provided to the classifying system or device in order to provide to the classifying system or device with examples or training data. The classifying system or device uses this training data, either directly or indirectly, to learn how to classify textual documents.

As used in the present specification and in the appended claims, the term "test documents" is meant to be understood broadly as any document that is to be classified by a classifying system or device. In one example, the test documents are presented for classification to the classifying system or device after the classifying system or device has undergone a training phase in which the above described original documents are used as training data, either directly or indirectly, to teach the classifying system or device how to classify textual documents such as these test documents.

As used in the present specification and in the appended claims, the term "pseudo-documents" is meant to be understood broadly as any document derived from the above-defined original documents. As described in more detail below, these pseudo-documents are used as examples or training data to teach the classifying system or device how to classify textual documents. In one example, these pseudo-documents may be used by the classifying system or device alone or in combination with the original documents, to provide the training of the classifying system or device. In one example, the pseudo-documents comprise a similar distribution of words as the original documents. In another example, the pseudo-documents comprise the same or approximately the same distribution of words as the original documents. In still another example, the pseudo-documents comprise a randomly perturbed value of the frequency of occurrence of words, phrases, or combinations thereof as the original documents. In this example, the random perturbed value is the mean or average of the distribution of words within the original documents.

As used in the present specification and in the appended claims, the terms "classifier," "machine learning classifier," "machine learning classifying device," or similar language is meant to be understood broadly as any hardware device or a combination of hardware devices and software that classifies a number of textual documents by topic or category. In the present specification, the machine learning classifying device further utilizes pseudo-documents created from a number of original documents to learn how to categorize a number of test documents, as will be described in more detail below.

Further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Throughout the below description, an example of classifying a number of documents in a news reporting scenario is described in which a number of people such as reporters prepare a number of textual documents. After being produced, these textual documents are classified by a machine learning classifying device in order to obtain a number of cataloged textual documents arranged by topics such as, for example, economy, sports, and politics, among many other topics.

In the above example, a number of documents are classified based on training data provided to the machine learning classifying device. The training data provides the machine learning classifying device with example data from which it can make a determination as to the topic of a textual document. The machine learning classifier searches for text, groups of text, patterns of text, or combinations thereof within the documents, and compares that text with a number of pre-assigned topics or categories available such as the above listed economy, sports, and politics, among others in classifying the textual documents into categories by, for example, topic.

Thus, although a news reporting scenario is described herein, this scenario is simply an example scenario in which the present systems and methods may be utilized. Any system or scenario that may benefit from the classification of documents may benefit from the present systems and methods.

At a high level, the present systems and methods use the Jackknife Document Replication (JDR) to create a number of additional training documents called pseudo-documents. The JDR removes a portion of an original text document to create a pseudo-document. These portions may be a number of words, a number of phrases, a number of lines, a number of paragraphs, a number of pages, portions of the above, or combinations thereof. For example, if an original text document comprises ten lines of text, the present systems and methods remove, for example, the first line of the original text document. This creates a first pseudo-document. The systems and methods may remove the second line of text within the original text document to create a second pseudo-document. This process may proceed until ten pseudo-documents are created by removing, in turn, each line of the ten-line original text document. In this manner, ten new pseudo-documents are then created, and can be used to train a machine learning classifying device.

Although the example of removing lines was presented above, any level of granularity may be applied where larger or smaller portions of the text is removed at each iteration. In one example, each removal of text is symmetric throughout all iterations. In this example, if two words are removed in the first iteration, then two words are removed from all remaining iterations.

In another example, if a portion of the original text document is removed, then that portion is not removed in a subsequent iteration. Thus, in this example, is the first two words are removed, then those two words are present in all remaining pseudo-documents created through all the iterations.

Turning now to the figures, FIG. 1 is a block diagram of a machine learning classifying device (100) for classifying textual documents, according to one example of the principles described herein. The machine learning classifying device (100) is a computing device that performs the methods described herein. In one example, the methods provided by the machine learning classifying device (100) are provided as a service over a network by, for example, a third party. In this example, the services provided by the machine learning classifying device (100) may be provided as software as a service (SaaS), infrastructure as a service (IaaS), other forms of network services, or a combination thereof. In another example, the machine learning classifying device (100) is executed by a local administrator.

In one example, the machine learning classifying device (100) is a mobile computing device such as, for example, a mobile phone, smart phone, personal digital assistant (PDA), or a laptop computer with the capability of performing the methods described herein. In another example, the machine learning classifying device (100) is a desktop computing device. In another example, the machine learning classifying device (100) may be provided as a service by a network computing resource provider, an administrator, or a third party, among other entities. In this example, the machine learning classifying device (100) may be executed on a single computing device, or may be distributed and executed across a number of devices located at any number of locations.

To achieve its desired functionality, the machine learning classifying device (100) comprises various hardware components. Among these hardware components may be a number of processors (102), a number of data storage devices (104), a number of peripheral device adapters (106), and a number of network adapters (108). These hardware components may be interconnected through the use of a number of busses and/or network connections. In one example, the processor (102), data storage device (104), peripheral device adapters (106), and a network adapter (108) may be communicatively coupled via bus (107).

The processor (102) may include the hardware architecture to retrieve executable code from the data storage device (104) and execute the executable code. The executable code may, when executed by the processor (102), cause the processor (102) to implement at least the functionality of receiving a number of original documents, deriving a number of pseudo-documents from the original documents, utilizing the derived pseudo-documents to learn how to classify a test document into a category, and classifying a number of test documents based on the learning, according to the methods of the present specification described herein. In the course of executing code, the processor (202) may receive input from and provide output to a number of the remaining hardware units.

The data storage device (104) may store data such as executable program code that is executed by the processor (102) or other processing device. As will be discussed, the data storage device (104) may specifically store a number of applications that the processor (102) executes to implement at least the functionality described above.

The data storage device (104) may include various types of memory modules, including volatile and nonvolatile memory. For example, the data storage device (104) of the present example includes Random Access Memory (RAM) (131), Read Only Memory (ROM) (132), and Hard Disk Drive (HDD) memory (133). Many other types of memory may also be utilized, and the present specification contemplates the use of many varying type(s) of memory in the data storage device (104) as may suit a particular application of the principles described herein. In certain examples, different types of memory in the data storage device (104) may be used for different data storage needs. For example, in certain examples the processor (102) may boot from Read Only Memory (ROM) (132), maintain nonvolatile storage in the Hard Disk Drive (HDD) memory (133), and execute program code stored in Random Access Memory (RAM) (131).

Generally, the data storage device (104) may comprise a computer readable medium, a computer readable storage medium, or a non-transitory computer readable medium, among others. For example, the data storage device (104) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. In another example, a computer readable storage medium may be any non-transitory medium that can contain, or store a program for use by or in connection with an instruction execution system, apparatus, or device.

The hardware adapters (106) in the machine learning classifying device (100) enable the processor (102) to interface with various other hardware elements, external and internal to the machine learning classifying device (100). For example, peripheral device adapters (106) may provide an interface to input/output devices, such as, for example, display device (110) or access other external devices (112). The display device (110) may be provided to allow a user to interact with and implement the functionality of the machine learning classifying device (100).

The peripheral device adapters (106) may also create an interface between the processor (102) and a printer, the display device (110), or other media output device. The network adapter (108) may provide an interface to other computing devices within, for example, a network, thereby enabling the transmission of data between the machine learning classifying device (100) and these other devices.

The machine learning classifying device (100) further comprises a number of modules used in training the machine learning classifying device (100) and classifying of test documents. The various modules within the machine learning classifying device (100) may be executed separately. In this example, the various modules may be stored as separate computer program products. In another example, the various modules within the machine learning classifying device (100) may be combined within a number of computer program products; each computer program product comprising a number of the modules.

The machine learning classifying device (100) may comprise a sampling module (140) to, when executed by the processor (102), receive a number of original documents, determine a number of sub-samples in a number of original documents, and store those original documents in an original document database (142). In one example, the sampling module (140) is stored within the data storage device (104) of the machine learning classifying device (100), and is accessible and executable by the processor (102).

The machine learning classifying device (100) may further comprise a pseudo-document creation module (150). The pseudo-document creation module (150) creates a number of pseudo-documents from the sub-samples, the pseudo-documents comprising a portion of the number of sub-samples. The pseudo-document creation module (150) stores the pseudo-documents in a pseudo-document database (152).

The machine learning classifying device (100) may further comprise a training module (160). The training module (160) utilizes a number of documents to train a classification module (170) associated with the machine learning classifying device (100). These documents comprise, for example, the original documents stored in the original document database (142), the pseudo-documents stored in the pseudo-document database (152), or combinations of the original documents and the pseudo-documents. As will be described below in more detail, the training of the classification module (170) may be achieved by capturing characteristics of interest of the original documents' and the pseudo-documents' to underlying probability distribution, and identifying the probability distribution as training data. This training data may be utilized as instances of the possible relations between observed variables in documents to be characterized such as the above-described test documents.

The machine learning classifying device (100) may further comprise a classification module (170). The classification module (170), after being trained, classifies a number of test documents into a category. In this manner, a test document may be stored within the test document database (172) based on the category into which that test document is assigned by the classification module (170). In this manner, searching for a test document on a particular topic, for example, may be more easily achieved by searching within a number of categories within the test document database (172) that are associated with that topic.

Thus, the present disclosure describes a JDR and an associated approach to generating new training data that is a sample of the true underlying language model, and is well-founded in statistics. Further, the present disclosure demonstrates that there is an adjointness between JDR and additive smoothing. Still further, the present application describes derivation of the optimal value of the additive smoothing parameter $\alpha$ when training data is scarce. Specifically, it is $$\frac{1}{15} < \alpha < \frac{1}{7}$$

for standard text datasets as opposed to the near-universal default. Even still further, the united approach described in the present application bridges the gap between Naïve Bayes and SVM in a scarce data regime.

The term 'Naïve Bayes' refers to a family of probabilistic classifiers all of which employ the simplification that given the class, features are independent. The present disclosure focuses on Multinomial Naïve Bayes (MNB), which may be the most appropriate version of Naïve Bayes for text classification. There are two variants of the MNB model which differ in how they treat word frequencies; Integer Multinomial (IMN) Event Model and Boolean MN (BMN) Event Model. These two variants of the MNB will now be described.

As to the Integer Multinomial (IMN) Event Model, let $|D|$ denote the number of tokens, counted with multiplicity, in document D. Furthermore, let $V=\{t_1, \ldots, t_{|V|}\}$ be the vocabulary of category c. In the IMN model, a document D is represented as a vector $D=\{x_1, x_2, \ldots, x_{|V|}\}$ where is the number of occurrences of token $t_i$ in D. The generative model is as follows: each document D in class c is seen as being generated by picking $|D|$ tokens independently, with probability of picking the token $t_i$ given by $P(t_i|c)$. Therefore, the probability $P(D|c)$ of the document D arising from the class c under this generative model is given by the multinomial distribution as follows:

$$P(D\mid c)=P(|D|)\cdot |D|!\cdot \prod_{i=1}^{|V|}\frac{P(t_i\mid c)}{x_i!} \qquad \text{Eq. 1}$$

For simplicity, it is assumed that the length of a document is independent of the class. A prior distribution $P_C$ can be assigned to the classes, and the following maximum aposteriori (MAP) classification rule may be derived that labels D with the class l(D) having the largest posterior probability:

$$l(D)=\underset{c}{\operatorname{argmax}}\left[\log P_C(c)+\sum_i x_i\log P(t_i\mid c)\right] \qquad \text{Eq. 2}$$

It remains to estimate the parameters $P(t_i|c)$ for each token $t_i$ and each class c, using the training data. This is done by counting the occurrences of the token $t_i$ in $T_c$: the set of all training documents of the class c. The resulting estimate is $$\hat{P}(t_i\mid c)=\frac{N_{ci}}{N_c},$$

where $N_{ci}$ is the total number of occurrences of token $t_i$ in documents of class c, and $N_c$ is the total number of word occurrences in the class c, including multiplicities.

However, a token that does not occur in any training sample in $T_c$ would result in a parameter estimate of zero, and would therefore cause the entire class conditional probability to go to zero. To avoid this, "additive smoothing" is used with parameter α as follows.

$$\hat{P}(t_i\mid c)[T_c,\alpha]=\frac{\alpha+N_{ci}}{\alpha|V|+N_c} \qquad \text{Eq. 3}$$

where [$T_c$, α] in Eq. 3 is used to denote that the estimate depends both on the training set $T_c$, and the choice of α, which is independent of $T_c$.

An almost universal choice for the smoothing parameter for Naïve Bayes is α=1, and the resulting smoothing is called "add-one" or "Laplace smoothing" since it is an application of Laplace's law of succession. When the classifier is derived entirely from MAP principles, then α=1 also corresponds to a symmetric Dirichlet conjugate prior with a concentration parameter of two.

As to the Boolean MN (BMN) Event Model, when a term occurs frequently in a document due to burstiness, the IMN model may assign an unreasonably high posterior log-odds ratio to the document. The BMN model avoids this by replacing the frequency count $x_i$ of token $t_i$ by $\min\{x_i,1\}$. Namely, BMN model counts each word occurrence only once.

Thus, the data-centric approach to dealing with the scarcity of training data for Bayesian classification is to map it to the statistical problem of estimation of parameters from a small sample of a population. Let X be a random variable whose distribution function is $F_X$. The present systems and methods are interested in some parameter θ of the distribution $F_X$ that is obtained by some statistical functional g, so that $\theta=g(F_X)$. Let $X_n$ denote a sample of size n drawn from $F_X$. Namely, $X_n=(X_1,\ldots,X_n)$ where $X_i$ are i.i.d. with distribution $F_X$. Let the empirical distribution function (EDF) of $X_n$ be denoted by $F_n(x,X_n)$.

Re-sampling and sub-sampling are two approaches that may be taken to deal with a dearth of samples. In both cases, the available samples are used to create "new" samples. In the first case, an available sample is viewed as an "image" of the true distribution, and then random re-samples are drawn from it. This is the approach of bootstrapping. However, the new samples are from the empirical distribution $F_n$, not the true distribution F. The approach of sub-sampling solves this by creating new samples by leaving out subsets of the original sample. This results in honest samples from the true distribution F itself, but of a smaller size.

Jackknife replication and bias reduction will now be described. The $i^{th}$ (delete-one) jackknife replication of $X_n$ is $$X_{(-i)}=\{X_1,\ldots,X_{i-1},X_{i+1},\ldots,X_n\} \qquad \text{Eq. 4}$$

which gives the EDF $F_{(-i)}$. We may estimate the parameter from this replication as $\hat{\theta}_{(-i)}=g(F_{(-i)})$.

The average estimate over all (delete-one) jackknife replications of the sample is given by $$\hat{\theta}_{(\cdot)}=\frac{1}{n}\sum_{i=1}^n g(F_{(-i)}) \qquad \text{Eq. 5}$$

The jackknife estimate of bias in $\hat{\theta}$ is $$\hat{\text{Bias}}_{jack}=(n-1)(\hat{\theta}_{(\cdot)}-\hat{\theta}) \qquad \text{Eq. 6}$$

The jackknife estimate of the parameter θ is given by $$\tilde{\theta}=\hat{\theta}-\hat{\text{Bias}}_{jack} \qquad \text{Eq. 7}$$

To get more replications, we can generalize to delete-d jackknifing, which yields $$\binom{n}{d}$$

replications.

Jackknife Document Replication (JDR) will now be described as an approach to dealing with the paucity of training data using jackknife principles. JDR is not a direct application of jackknife bias reduction. Instead, it is a simplification that ties in well with the MNB model. In classic jackknife, multiple estimators are constructed and a linear combination is used to reduce bias. In JDR, however, the form of Eq. 3 is used to do the combination, resulting in a single estimator that is analogous to $\hat{\theta}_{(\cdot)}$.

In JDR, shown in Pseudo-code 1 below, s subsamples are created from D by deleting s non-overlapping portions that together cover D, in turn. The classifier is now trained with:

$$JDR[s,T_c]:=T_c\cup\{D_{(-i)},\ldots,D_{(-s)}:D\in T_c\} \qquad \text{Eq. 8}$$

Pseudo-code 1: Jackknife Document Replication

Require: Document D = {$w_0,\ldots,w_{|D|-1}$} and s > 1
Ensure: s jackknife replications of D
1:  for i = 1, 2, . . . , s do
2:   /* Define portion of D to delete */
3:   $\text{startdel}=\left\lceil\frac{(i-1)|D|}{s}\right\rceil-1$
4:   $\text{enddel}=\left\lceil\frac{i|D|}{s}\right\rceil$
5:   D(-i) = {$w_0,\ldots,w_{startdel},w_{enddel},\ldots,w_{|D|-1}$}
6:  end for Next is described the above-mentioned model-centric approach. In the model-centric approach the question of learning from scarce data is approached by examining the data-independent additive smoothing parameter of the model. The setting α=1 is an additive smoothing that provokes the question of "should the smoothing parameter be increased or decreased if data is scarce." In some examples, when data is scarce, it may be assumed that the smoothing should be increased in order to avoid overfiting.

The present disclosure provides a principled approach to the problem of parameter setting for additive smoothing by connecting it to the jackknife approach to dealing with limited training data described above. The extensive empirical and theoretical foundations of jackknifing in statistics is utilized. This relation will be made through a notion of "adjointness."

The term "adjoint" is used generally in situations where there exists an equation of the form $$\langle Ax, y \rangle = \langle x, By \rangle,$$ Eq. 9 where A;B are operations on the objects x; y, and the pair (x, By) has an interpretation. Such relations often allow a particular operation to be understood better by studying its adjoint. For purposes of this disclosure, A will be an operation on the training data T of a classifier, and B will be an operation on the data-independent choices of its model. Adjointness will then arise as a result of equality of the parameter estimates of the classifier.

Jackknifing the data is adjoint to smoothing the model. A rather surprising relationship between jackknifing, which is an approach that involves manipulating data, to smoothing, which is about defining models, is demonstrated as follows. For IMN, with notation as in Eq. 3 above, the following jackknife-smoothing adjointness may be represented by:

$$\hat{P}(t_i \mid c)[JDR[s, T_c], \alpha] = \hat{P}(t_i \mid c)\left[T_c, \frac{\alpha}{s}\right]$$ Eq. 10

First, it can be observed that due to the form of Eq. 3, in IMN all the training documents for c may be concatenated into one super-document.

Now, let ⌊ ⌋ denote concatenation, and ~ denote equality of the bag of words representation. Since JDR deletes each portion from exactly one replication, $$\bigsqcup_{i=1}^{s} D_{(-i)} \sim \underbrace{D \sqcup, \ldots, \sqcup D}_{(s-1) \text{ times}}$$ Eq. 11

This, along with Eq. 8, gives, by plugging into Eq. 3, $$\hat{P}(t_i \mid c)[JDR[s, T_c], \alpha] = \frac{\alpha + sN_{ci}}{\alpha|V| + sN_c}$$ Eq. 12

$$= \frac{\frac{\alpha}{s} + N_{ci}}{\left(\left(\frac{\alpha}{s}\right)|V| + N_c\right)}$$ Eq. 13

$$= \hat{P}(t_i \mid c)\left[T_c, \frac{\alpha}{s}\right]$$ Eq. 14

For BMN, Eq. 10 holds for tokens all of whose occurrences lie within a single deleted portion. For others, replace s by s+1 on the right hand side of Eq. 10. For simplicity, we assume Eq. 10 without change from here on for all cases. Therefore, by lowering the additive smoothing parameter (or Dirichlet symmetric prior) to 1/s of its former value, learning from the original data plus s jackknife replications can be simulated.

By using this adjointness feature of JDR, the present systems and methods may be implemented with no additional cost in terms of training. The smoothing parameter is simply lowered. Thus, JDR becomes a cost-free improvement to Bayesian learning with MNB. In cases where the model parameters are not accessible to the user, JDR has the data-centric $O(\Sigma_c T_c)$ implementation. Here, it is noted that Eq. 10 is not applicable to bootstrap re-sampling due to the randomization therein.

The above also demonstrates that, when training data is scarce, the smoothing parameter should be lowered. The intuition is that when data is scarce, a user would like to learn as much as possible from it, and not smooth the already small "signal" by adding white noise (which is effectively what smoothing does).

Figure 2:
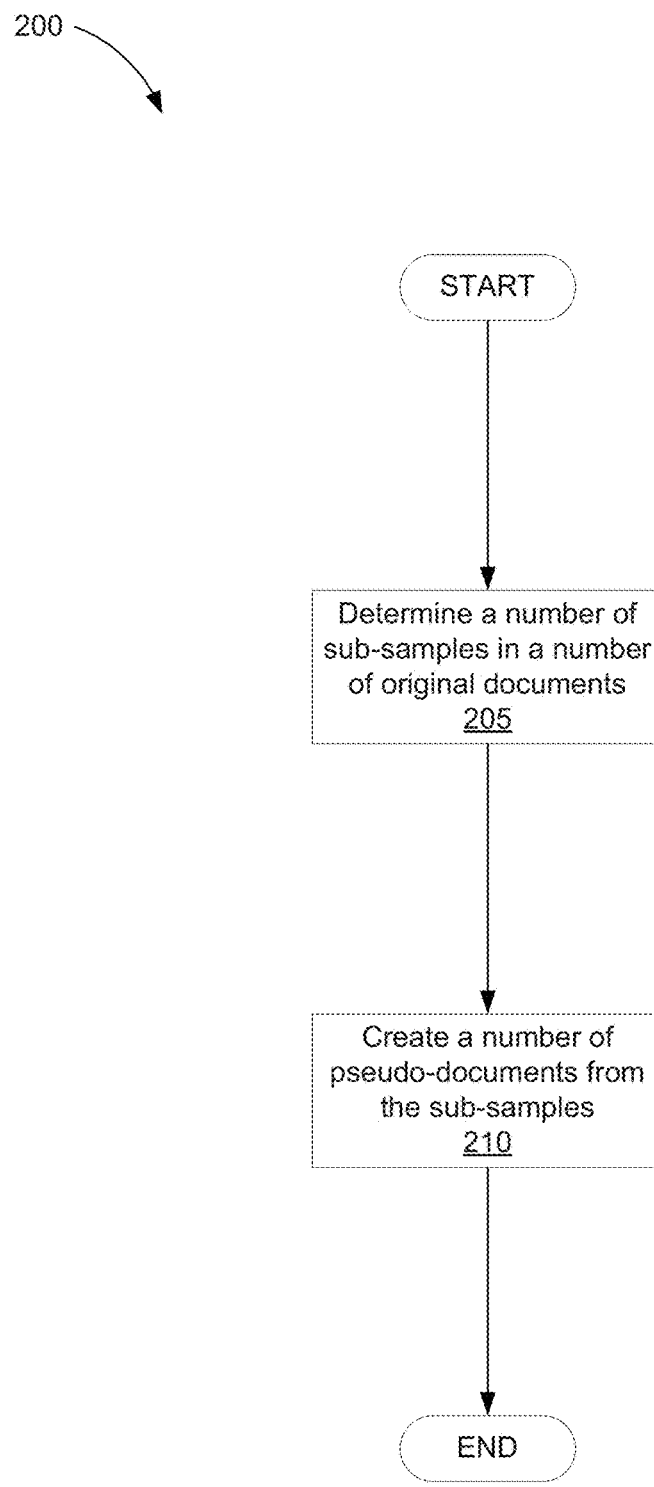
FIG. 2 is a flow chart showing a method of generating training documents for training a classifying device, according to one example of the principles described herein.

Turning now again to the figures, FIG. 2 is a flow chart (200) showing a method of generating training documents for training a classifying device (100), according to one example of the principles described herein. The method of FIG. 2 may begin with the processor (102) of the machine learning classifying device (100) executing the sampling module (140) to determine (block 205) a number of sub-samples in a number of original documents. The original documents may be stored in the original document database (142), and retrieved from the original document database (142) by the processor (102).

As described above, the present systems and methods may be employed in situations where scarce training data is available. In one example, between 1 and 10 original documents may be presented to a user. In many situations, this relatively low number of original documents may be insufficient to train the machine learning classifying device (100). Therefore, processor obtains a number of sub-samples from these original documents.

The processor (102) of the machine learning classifying device (100) executes the pseudo-document creation module (150) to create (block 210) a number of pseudo-documents from the sub-samples obtained at block 205. As defined above, the term "pseudo-documents" is meant to be understood broadly as any document derived from the original documents. In one example, the pseudo-documents may comprise a sub-sampling of the original documents. For example, the sub-samples may comprise any portion of the original document by in systematically leaving out or removing a number of portions at a time from the original documents.

In one example, the pseudo-documents may comprise the entirety of the text of the original document. In this example, the pseudo-documents comprise all the text within the original document. In another example, the pseudo-documents may comprise less than the entirety of the text of the original document.

In another example, in some situations, more than one original document may be provided in order to train the machine learning classifying device (100). In one example, the processor (102) may execute the sampling module (140) and pseudo-document creation module (150) to combine sub-samples from two or more of the original documents. In this example, a hyperset of sub-samples is created from which a number of pseudo documents may be created via block 210. In another example, the processor (102) may execute the sampling module (140) and pseudo-document creation module (150) to sample the distribution of words from each original document individually. In this example, individual sets of sub-samples are created from which a number of pseudo documents may be created individually via block 210. In still another example, a combination of the two above examples may be utilized.

In one example, the pseudo-documents may be unintelligible to a human. In this example, although the pseudo-documents may contain a sub-sample of the original documents, the words or phrases within the pseudo-documents may not be ordered in an intelligible manner or in a manner in which a human may be able to understand the pseudo-documents.

The number of pseudo-documents created (block 210) from a number of original documents may be between 10 and 40. In another example, the number of pseudo-documents created (block 210) from a number of original documents may be between 16 and 32. In still another example, the number of pseudo-documents created (block 210) from a number of original documents may be between 8 and 16. These pseudo-documents are used as examples or training data to teach the machine learning classifying device (100) how to classify textual documents. In one example, these pseudo-documents may be used by the classifying system or device alone or in combination with the original documents, to provide the training of the classifying system or device.

Figure 3:
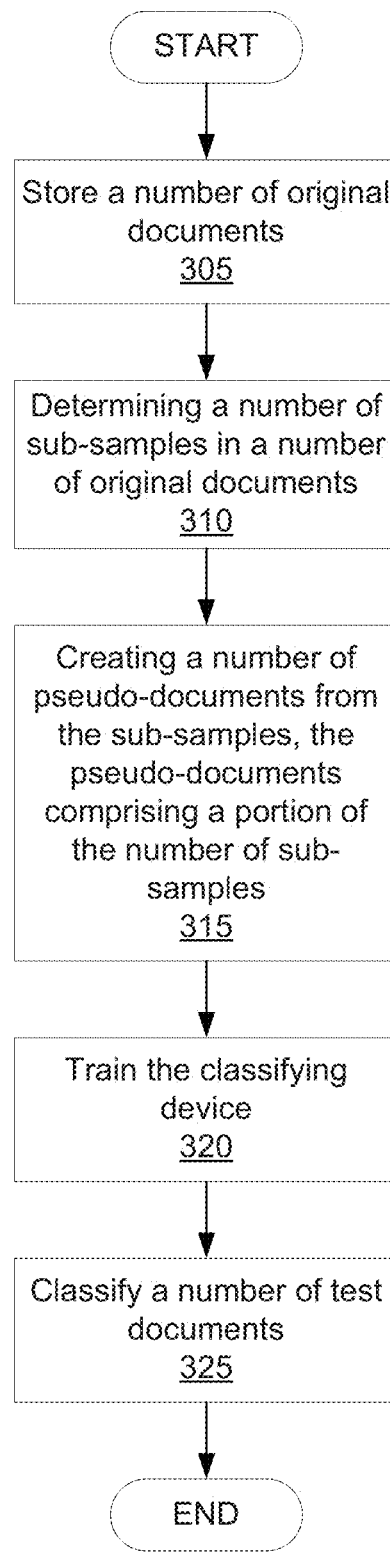
FIG. 3 is a flow chart showing a method of generating training documents for training a classifying device, according to another example of the principles described herein.

FIG. 3 is a flow chart showing a method of generating training documents for training a classifying device (100), according to another example of the principles described herein. The method of FIG. 3 may begin with the processor (102) of the machine learning classifying device (100) storing (block 305) a number of original documents. The original documents may be stored in the original document database (142) of the data storage device (104). The original documents may be provided to the machine learning classifying device (100) from a user or administrator that is seeking to teach the machine learning classifying device (100). In another example, the original documents may be searched for and obtained by the machine learning classifying device (100) autonomously.

The method may proceed with the processor (102) of the machine learning classifying device (100) executing the sampling module (140) to determine (block 310) a number of sub-samples in a number of original documents. The processor (102) executes the pseudo-document creation module (150) to create (block 315) a number of pseudo-documents from the sub-samples obtained at block 310 as similarly described above in connection with FIG. 2. The pseudo-documents may be stored in, for example, the pseudo-document database (152).

The processor (102) of the machine learning classifying device (100) may execute the training module (160) to train (block 320) the machine learning classifying device (100) on how to classify test documents as they are presented for classification. The processor executes the classification module (170) to classify (block 325) a number of test documents. The test documents are those documents that a user of the machine learning classifying device (100) desires to have categorized. These documents may be received and stored by the processor (102) in the test document database (172) of the data storage device (104). The processor retrieves the test documents from the test document database (172) when the test documents are to be classified.

The above systems and methods were tested extensively on both binary and multiclass problems arising from two benchmark datasets for text classification. The first benchmark dataset is referred to as a "20Newsgroups dataset." It contains roughly 20,000 articles posted to 20 newsgroups. The articles are more or less evenly divided between the newsgroups. For binary classification, the 10 problems that were randomly chosen by R. Raina, A. Y. Ng, and D. Koller, in their work entitled, "Constructing Informative Priors Using Transfer Learning" found in *Proceedings of the 23rd international conference on Machine learning* (Pittsburgh, Pa., 2006), ACM are used. This reference is hereby incorporated by reference in its entirety. For multiclass classification, the full set of 20 classes defined by the newsgroups is used. Since each article comes with a usenet header, all headers were removed before tokenizing. The RAINBOW computer program toolkit was used to preprocess the data and also implement the Naïve Bayes classifiers. Tokens represent contiguous alphabetic characters. The stoplist supplied by RAINBOW computer program toolkit was used. Stemming was not employed. Words that appear fewer than three times in the dataset were also removed.

The second dataset is the WebKB data set described by M. Craven, D. DiPasquo, D. Freitag, A. McCallum, T. Mitchell, K. Nigam, and S. Slattery in their work entitled, "Learning to Extract Symbolic Knowledge from the World Wide Web," found in *Proceedings of the 15th National Conference on Articial Intelligence* (Menlo Park, Calif., USA, 1998), pp. 509-516. This reference is hereby incorporated by reference in its entirety. The WebKB data set comprises web pages gathered from computer science departments at various universities. Each page falls into one of seven categories: student, faculty, staff, course, project, department, and other. Previous studies have used only the four most populous categories, student, faculty, course, and project, and the below experiments do the same. These four categories consist of 4,199 web pages total. Since there are only four categories, all six binary classification problems are used, and the single multiclass classification problem resulting from using all four categories.

With regard to stoplisting the WebKB dataset, it may be that stoplisting may hurt the accuracy of classifiers on WebKB because some stoplisted words such as, for example, the word "my," have high information gain with respect to certain categories such as, for example, the "student" category. To be methodologically rigorous, the experiments are performed both with and without stoplisting. To save space, individual binary classification problems are shown in the figures without stoplisting, but show averages for both cases without and with stoplisting.

Since the present experiments focus on training with very scarce data, training data sizes used include [2; 4; 6; 10; 20; 50; 100] on all experiments; binary as well as multiclass. This may reflect real-world enterprise text classification scenarios. The training data for 20Newsgroups is chosen at random from the "training" split of the dataset, and the entire "testing" split is used for testing. On the WebKB corpus, training documents are chosen at random from "Cornell," "Texas," "Washington," and "Wisconsin," and are tested on "Miscellaneous" so as not to over easy instances. Each experiment is run 10 times and the average over the 10 runs are reported. On all experiments, the results are expressed in terms of accuracy of class prediction.

The Reuter's dataset is not used since a high accuracy of binary classification is returned even with very limited training data. Thus, Reuter's dataset does not reflect real world enterprise data in this regard.

A linear support vector machine (SVM) is used as a benchmark. SVMs generally offer the best accuracy in text classification, and linear SVMs are almost as accurate as those with more complex kernels for this task. The SVM-LIGHT package developed at Cornell University was used for the experiments. For tuning, the single "penalty factor" C is varied through the values [$10^{-4}$; $10^{-3}$; $10^{-2}$; $10^{-1}$; 1; $10^1$; $10^2$; $10^3$; $10^{-4}$] and adopts the value with the highest accuracy.

The results of the above experimentation will now be described. FIGS. 4 through 13 depict these results. Specifically, FIGS. 4 through 11 show a number of charts depicting the results for binary problems for a 20Newsgroups data set, according to another example of the principles described herein. FIGS. 4 through 11 generally depict error rate (Y-axis) versus number of samples per class (X-axis, log scale) (1) averaged over the 10 binary problems in 20Newsgroups, and 6 binary problems in WebKB, and (2) for the 20-class problem on 20Newsgroups, and the 4-class problem on WebKB. In both (1) and (2), stopwords have not been removed from WebKB.

Figure 12:
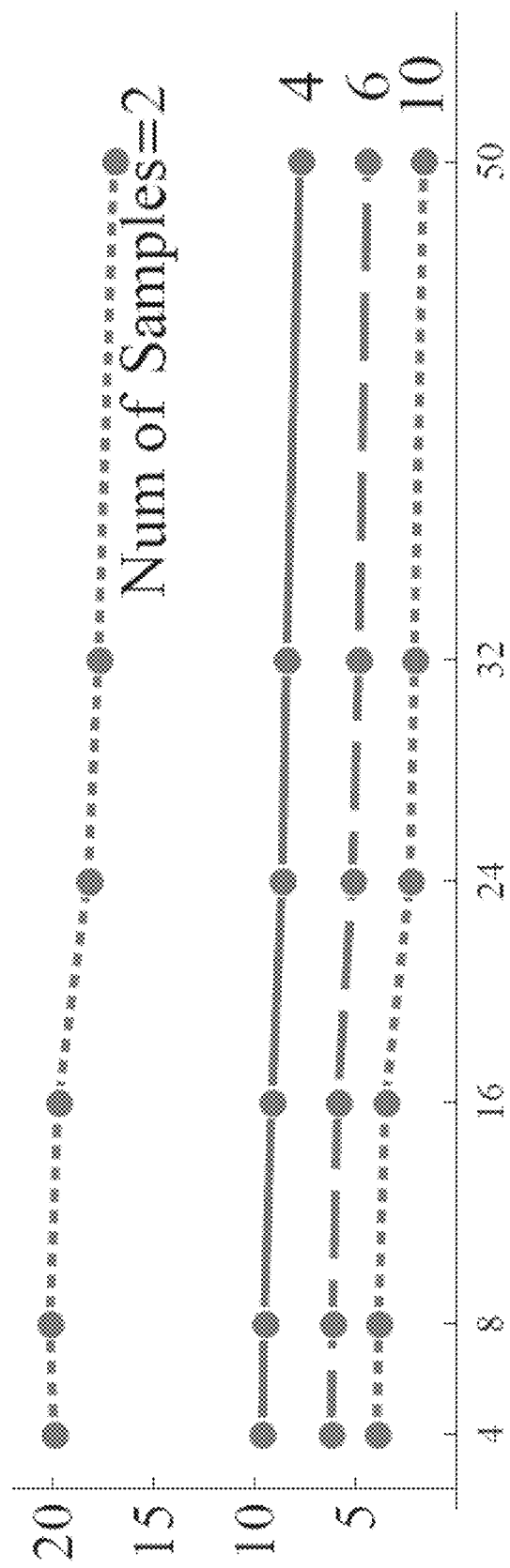
FIG. 12 is a chart depicting the accuracy of IMN as a function of for a number of different training sample sizes.

FIG. 12 is a chart depicting the accuracy of IMN as a function of for a number of different training sample sizes. FIG. 12 depicts percent (%) improvement to accuracy (Y-axis) for IMN as function of s (X-axis) for different training sample sizes.

Figure 13:
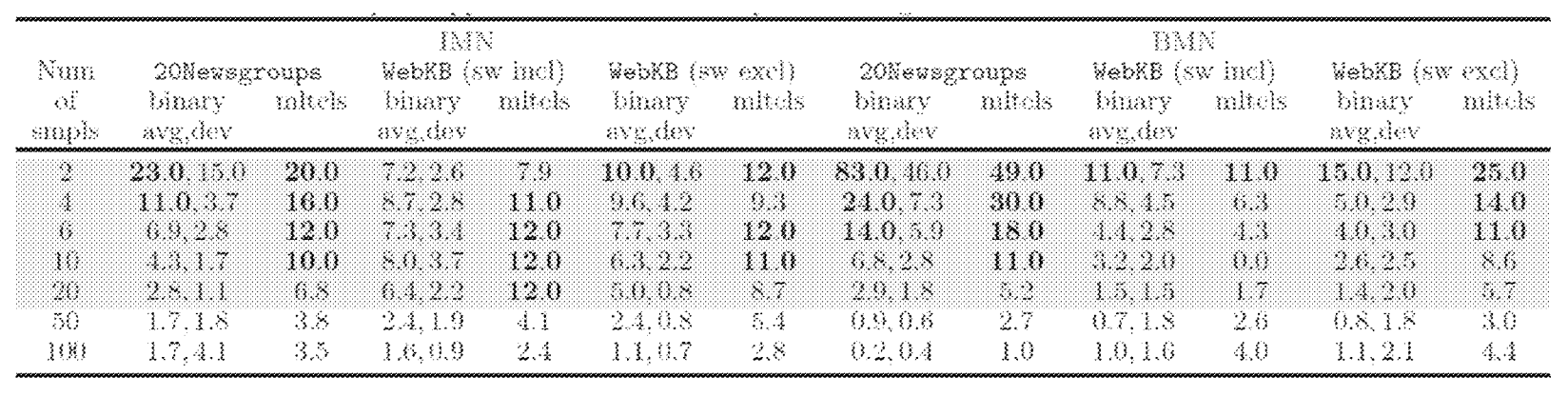

FIG. 13 is a table depicting the performance of the Naïve Bayes, according to one example of the principles described herein. The table of FIG. 13 depicts maximum percentage improvements to baseline Naïve Bayes caused by JDR. This occurs either at s=8 or at s=16, with very little difference between the two values; therefore to save space, only maximum is shown. For binary problems, the average and standard deviation ("dev") across the 10 problems of 20Newsgroups, and the 6 problems of WebKB is shown. Experiments with and without stoplisting on WebKB are both shown. Region with very scarce training data that is common in enterprise applications is shaded. Improvements greater than 10% are in bold.

Figure 4:
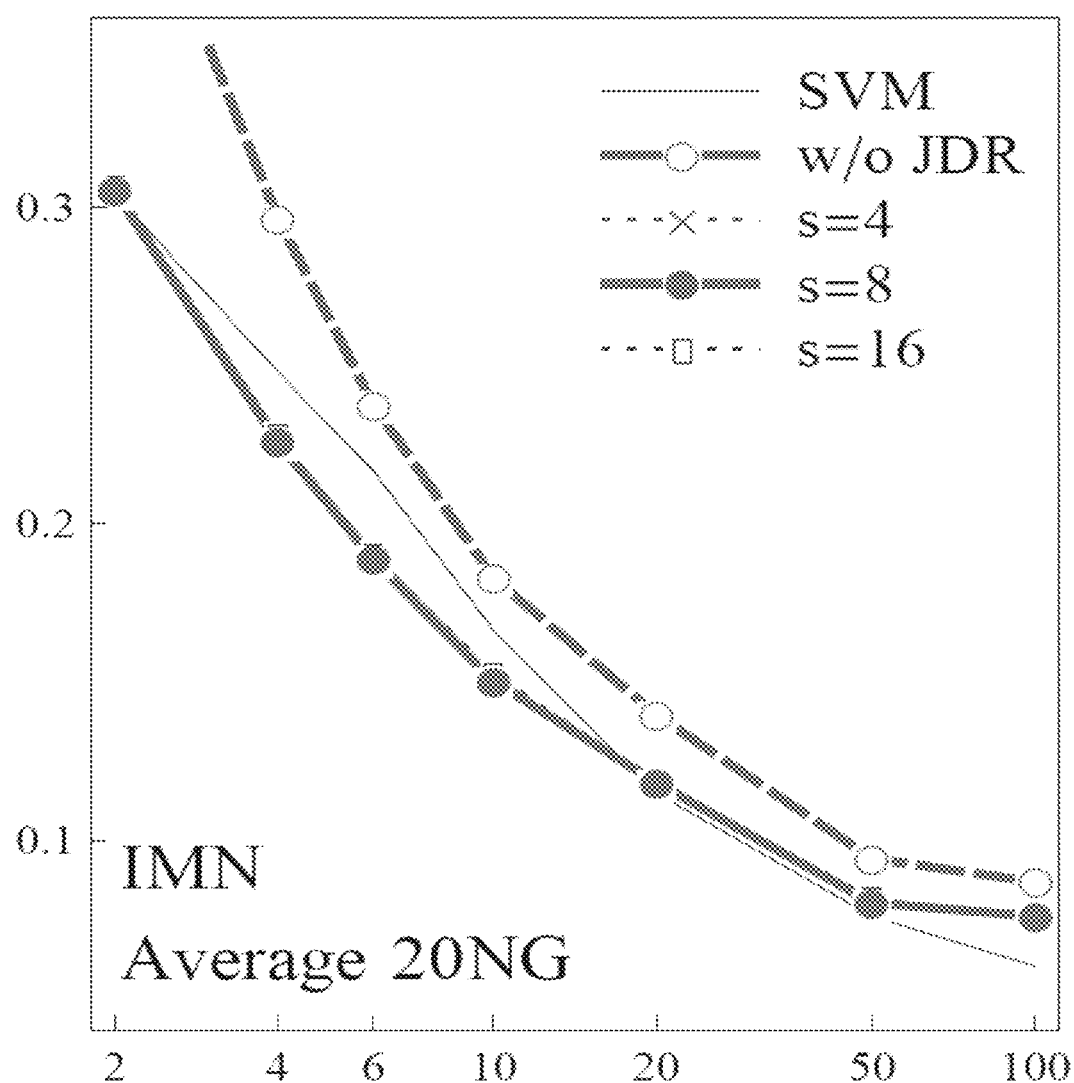
FIGS. 4 through 11 show a number of charts depicting the results for binary problems for a 20Newsgroups data set, according to another example of the principles described herein.
Figure 5:
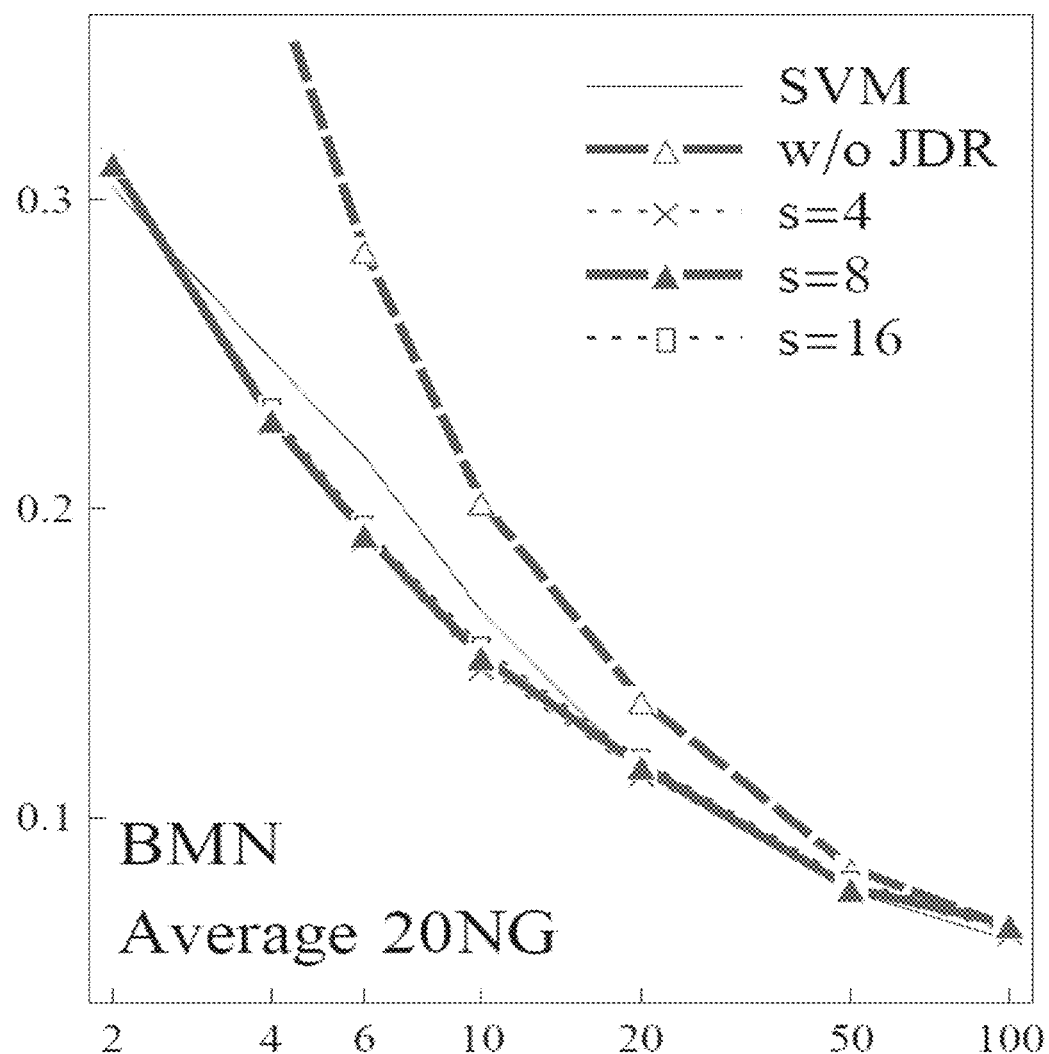
Figure 6:
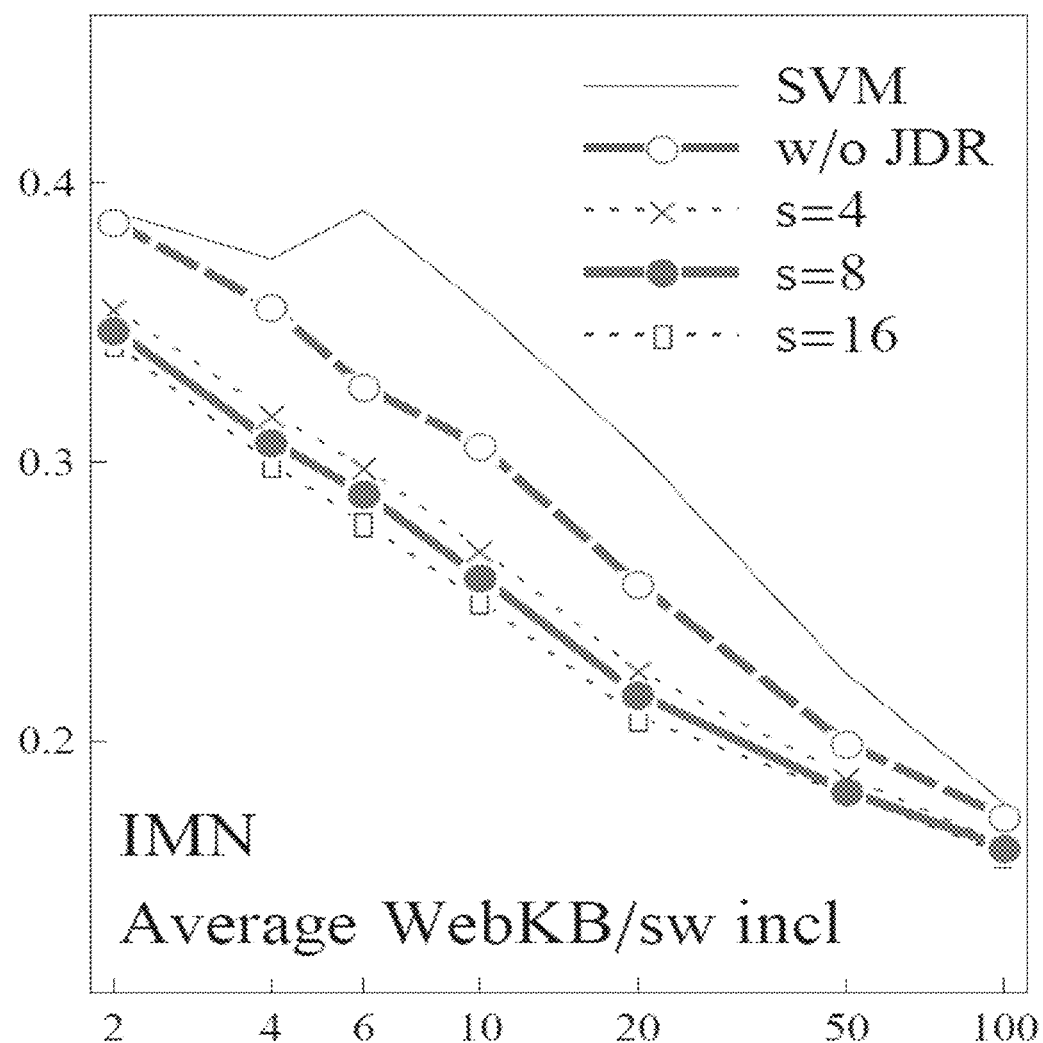
Figure 7:
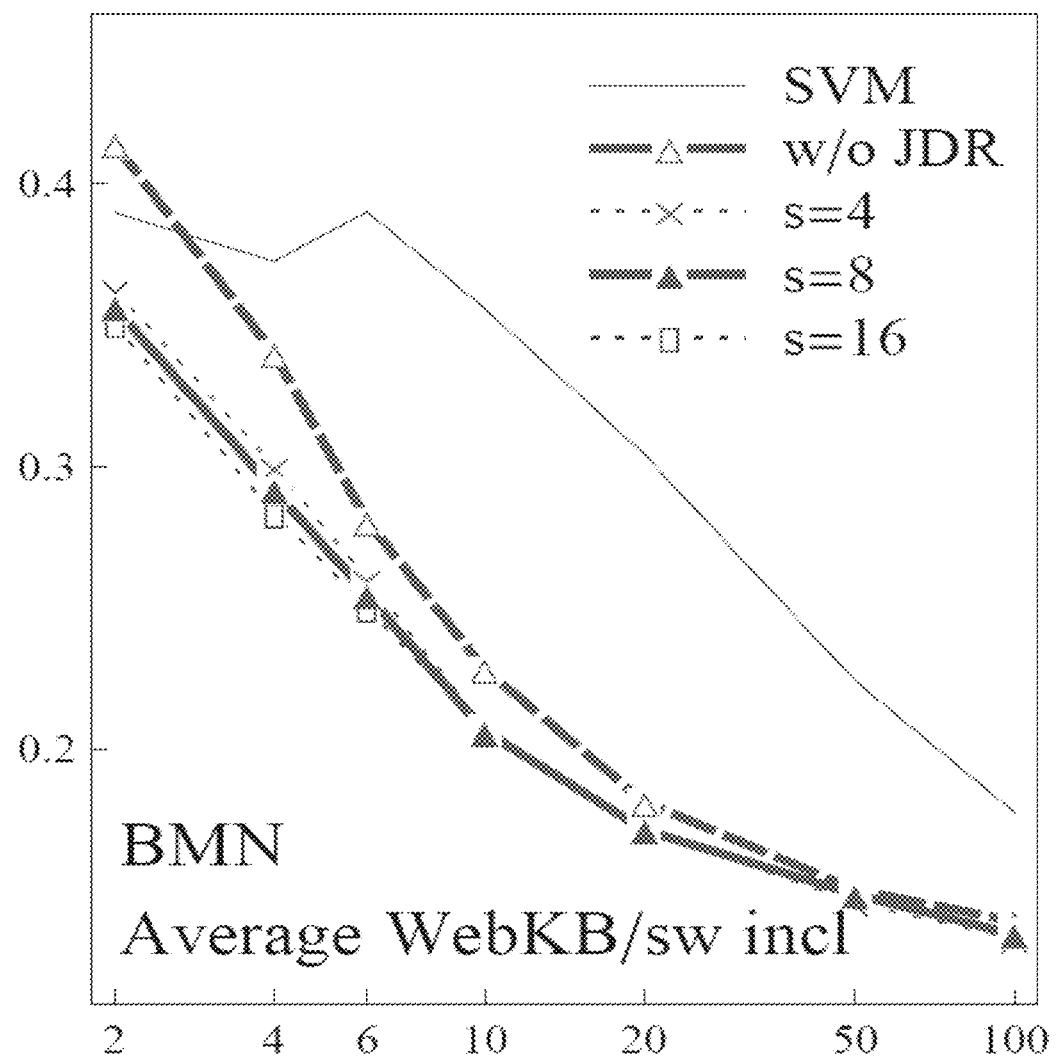
Figure 8:
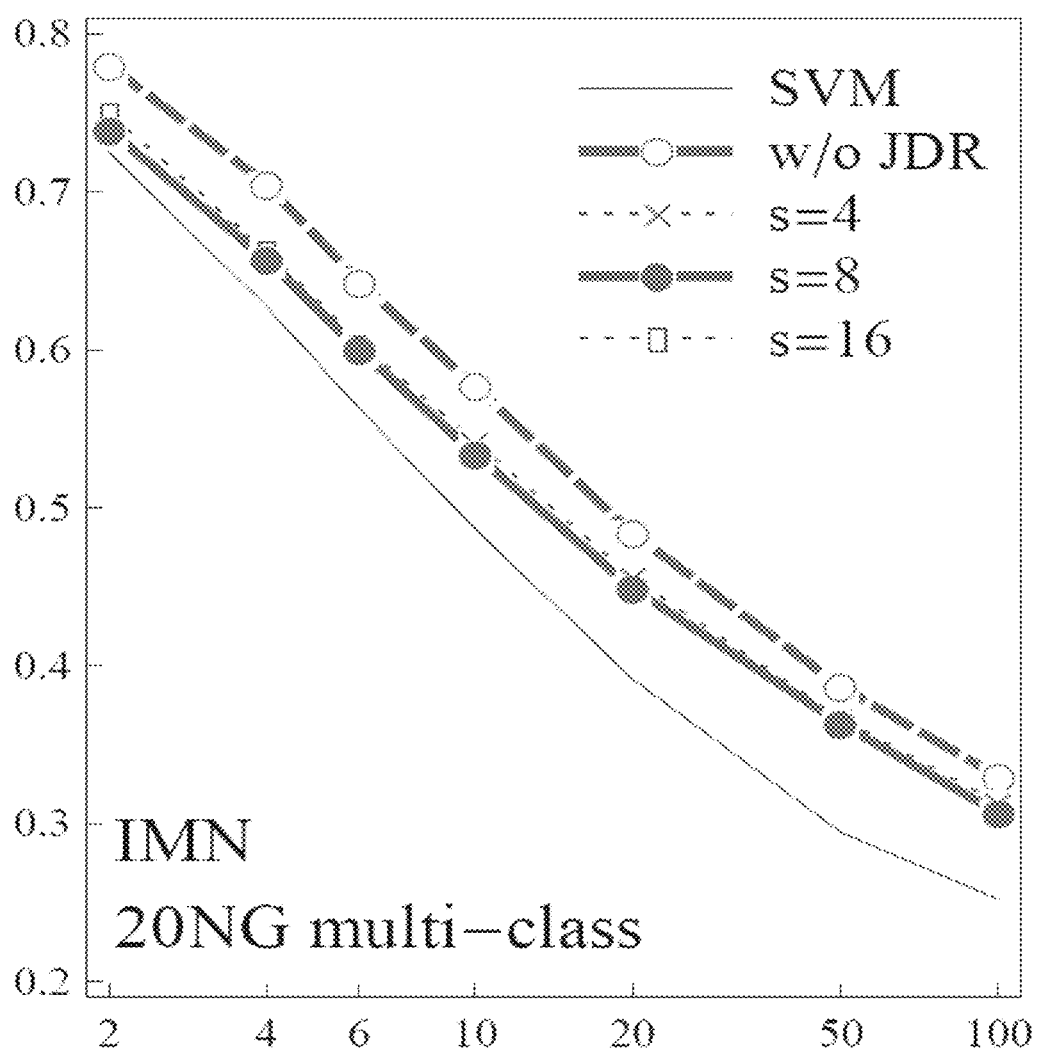
Figure 9:
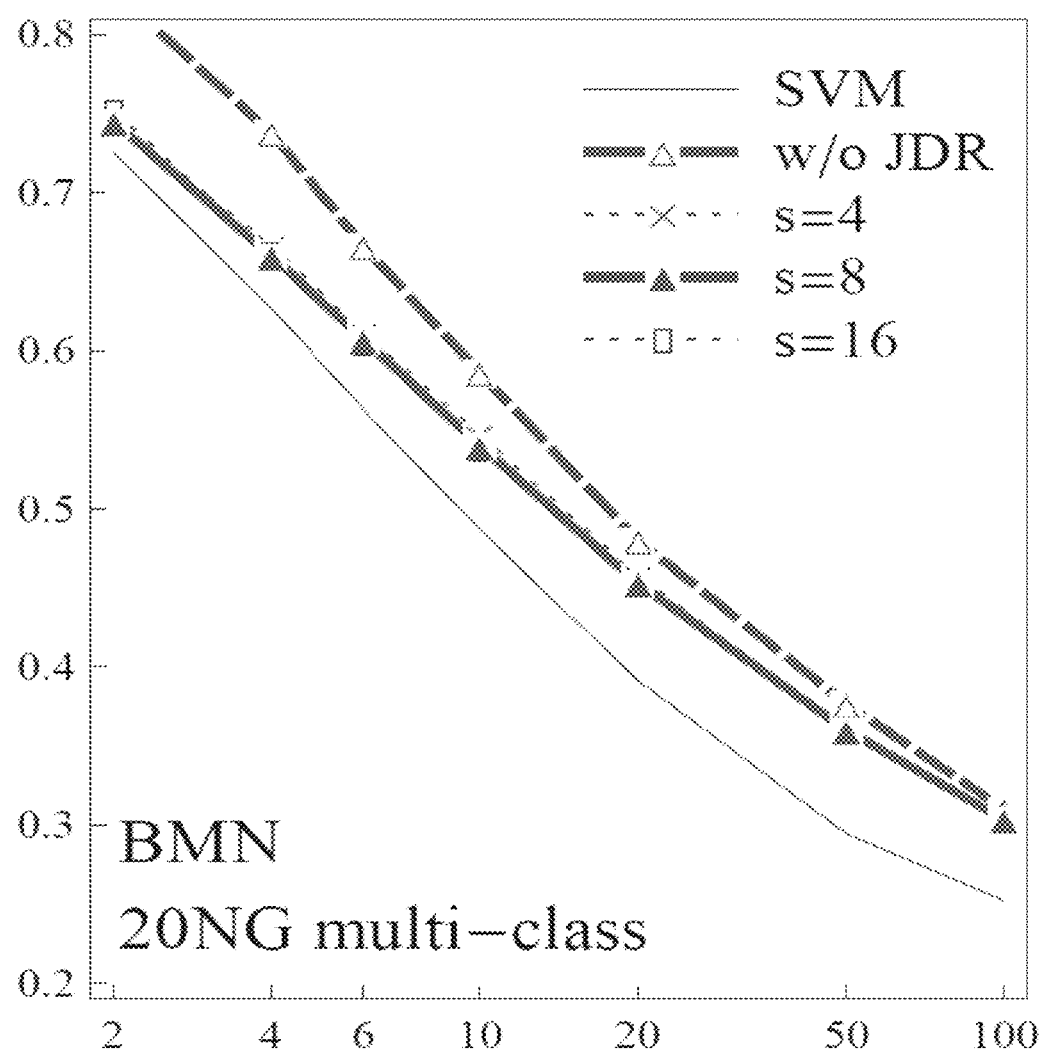
Figure 10:
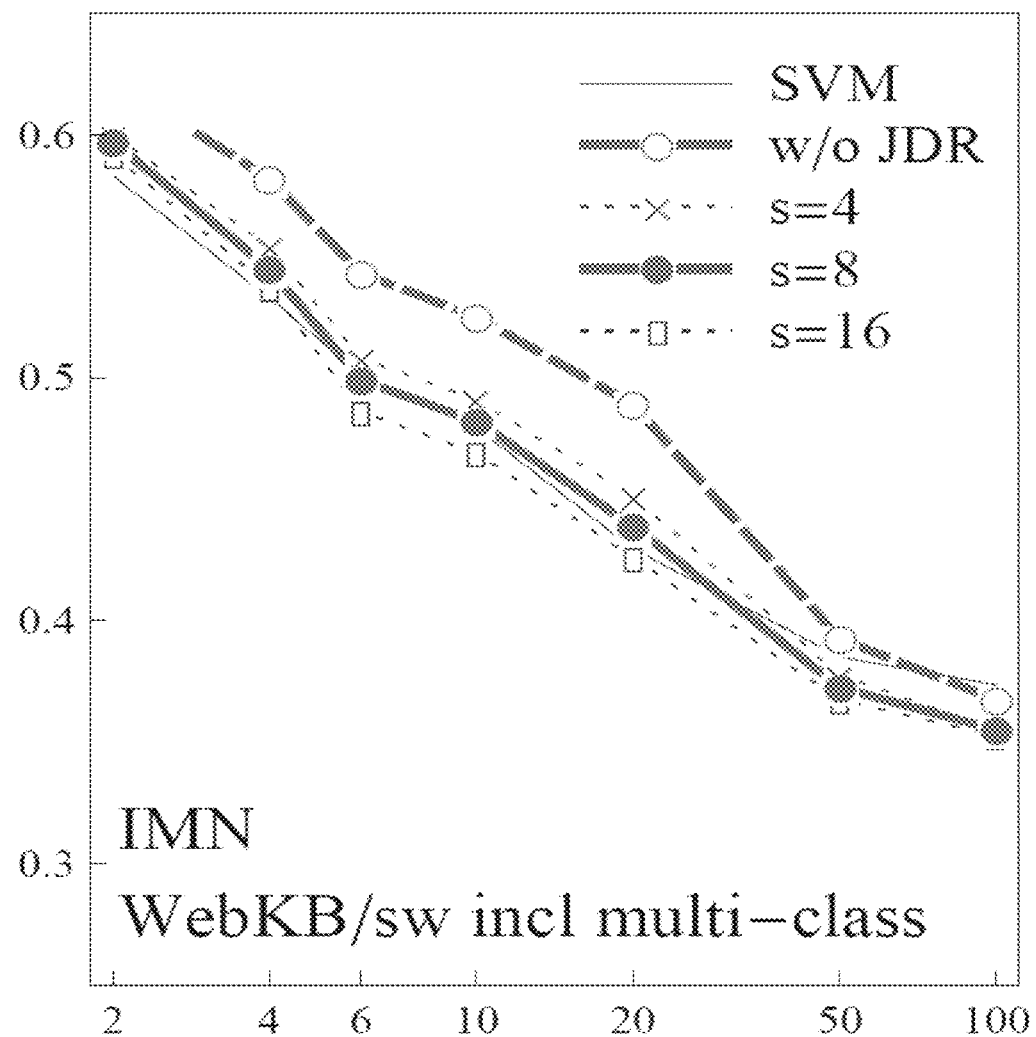
Figure 11:
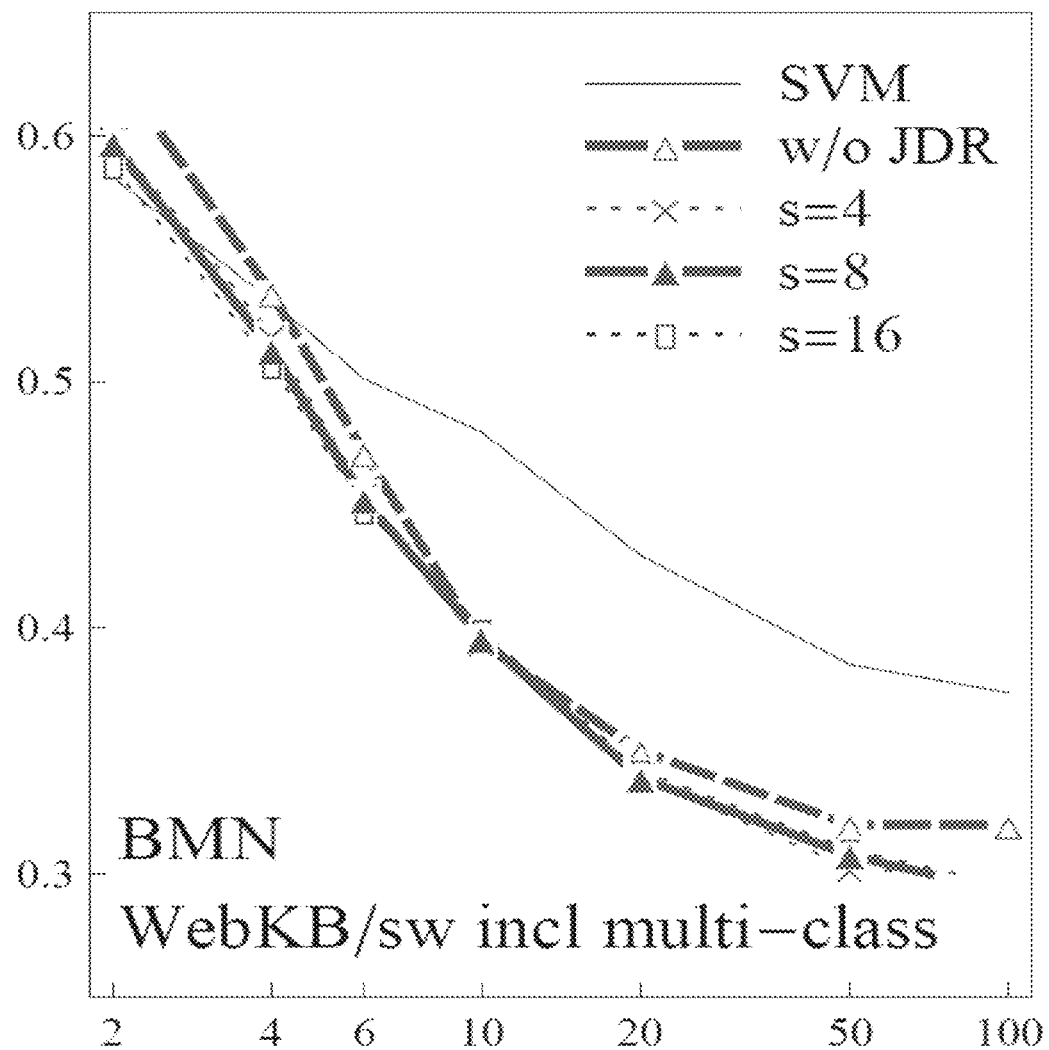

JDR results in consistent improvement in accuracy for all classification experiments, both in individual problems, and on the average (see, FIG. 4). The standard deviation on the improvements as depicted in the table of FIG. 13 is consistently lower than the average when the latter is significant. This also shows that JDR is a stable procedure, not introducing high variances into the classifier.

Further, JDR yields larger improvements for smaller training sample sizes, and gives substantial improvements for very small training samples (e.g., ≤20 training samples) which are common in enterprise applications. Still further, improvements can be dramatic with less than 5 training samples. For 2 samples per class, the improvement to BMN is 84% for binary, and 49% for multiclass. This is sometimes the mode for enterprise class problems.

Even still further, both IMN and BMN classifiers benefit from JDR. BMN shows higher peaks of improvement. This is favorable since BMN is also slightly more accurate than IMN at text categorization. Further, in only four problems (both binary) out of the 38 studied did JDR have a region of lower accuracy than the baselines without JDR. In all four cases, the decrease in accuracy was nominal.

Among the 38 classification benchmarks used, in 32 (84.21%) a definite advantage is demonstrated to using JDR, and even in the remaining 4 cases, accuracy is not significantly lost. This consistent evidence supports the use of JDR when training data is scarce.

The results of how Naïve Bayes with JDR compares to SVM will now be described. First, the baseline accuracy of both IMN and BMN is lower than SVM throughout the range of study. For binary classification, with JDR, SVM was beaten in the region of very scarce data (e.g., ≤20 training samples), and also bridge the gap for more training data. Second, of the 32 binary problems experimented with, on 19 the SVM was more accurate than the baseline Naïve Bayes without JDR in the very scarce region (e.g., ≤20 training samples). Of these 19, on 15, the use of JDR pushed Naïve Bayes above SVM in accuracy in this region. That yields a 78% rate of success in beating SVM when using JDR in the very scarce training data regime.

Third, in 4 of the 6 multiclass problems tested, SVM was better than Naïve Bayes. In one of these, Naïve Bayes with JDR beats SVM, while in another, there is no significant difference between the two. In the remaining two, it consistently reduces the gap throughout the range of testing (see, FIG. 5). Out of the 24 binary and multiclass problems where Naïve Bayes lagged behind SVM, the use of JDR allowed it to outperform SVM in 17, yielding a 70.8% success rate.

The empirically determined value of s at which JDR gives the most improvement in accuracy may now be mated to the adjointness property of Eq. 10. In our experiments, the optimum value of s always was either 8 or 16, after which accuracy began to fall (see, FIG. 2). Eq. 10, above, then gives the following "safe" region for the additive smoothing parameter, which is significantly below the default:

$$\frac{1}{16} \leq \alpha \leq \frac{1}{8}$$

JDR may not provide gains for non-parametric classifiers such as SVM and kNN, both of which suffer a degradation in accuracy if used with JDR. Further, the adjointness that relates JDR to additive smoothing is a feature only of Bayesian classifiers.

The present disclosure describes a modified form of jackknife estimation for Bayesian document classification. The improvements in accuracy by adopting the jackknife approach are consistent and significant to baseline Naïve Bayes. As demonstrated, the jackknife approach has a "cost-free" implementation in the sense that it can be "simulated" by resetting the value of the Laplacean prior. Using this adjointness, and the stability of the empirical results around the parameters of JDR, a value of the additive smoothing parameter may be that is different from the default. While the approach on Naïve Bayes was demonstrated, the technique applies, and the adjointness goes through for other language models (n-gram) as well.

This raises a question; should the prior be a function of the training data instead of a fixed value? The present findings suggest that when training data is scarce, the prior should be lowered in order to simulate jackknife replications of the training data. This is applicable to all training data, not just text.

The jackknife approach described herein may be applied to the problem of imbalanced training data, and may be an adjunct to semi-supervised learning. The jackknife is non-parametric, making no assumptions on the data, and can be used on datasets where semi-supervised learning does not work because model assumptions are violated.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (102) of the machine learning classifying device (100) or other programmable data processing apparatus, implement the functions or acts specified in the flowchart and/or block diagram block or blocks. In one example, the computer usable program code may be embodied within a computer readable medium; the computer readable medium being part of the computer program product. In another example, a computer readable medium may be any non-transitory medium that can contain, or store a program for use by or in connection with an instruction execution system, apparatus, or device. In still another example, the computer usable program code may be embodied within a computer readable storage medium.

The specification and figures describe a method of generating training documents for training a classifying device comprising, with a processor, determining a number of sub-samples in a number of original documents, and creating a number of pseudo-documents from the sub-samples, the pseudo-documents comprising a portion of the number of sub-samples. The present disclosure further provides for a device for training a classifying device, comprising a processor, and a memory communicatively coupled to the processor. The memory comprises a sampling module to, when executed by the processor, determine a number of sub-samples in a number of original documents, a pseudo-document creation module to, when executed by the processor, create a number of pseudo-documents from the sub-samples, the pseudo-documents comprising a portion of the number of sub-samples, and a training module to, when executed by the processor, train a classifying device to classify textual documents based on the pseudo-documents.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of generating training documents for training a classifying device comprising, with a processor:
   determining a number of sub-samples in a number of original documents; and
   creating a number of pseudo-documents from the sub-samples, the pseudo-documents comprising a portion of the number of sub-samples,
   in which each of the pseudo-documents are created by deleting a number of the sub-samples through a jack-knife statistical method.

2. The method of claim 1, in which each of the pseudo-documents comprise less than all of the sub-samples.

3. The method of claim 1, in which each of the pseudo-documents comprise all of the sub-samples.

4. The method of claim 1, in which the sub-samples comprise a number of words, phrases, lines of text, or a combination thereof.

5. The method of claim 1, further comprising training a classifying device to classify textual documents based on the pseudo-documents.

6. The method of claim 5, further comprising classifying a number of test documents based on the training.

7. The method of claim 1, further comprising training a classifying device to classify textual documents based on the original documents, the pseudo-documents, or a combination thereof.

8. The method of claim 1, in which creating a number of pseudo-documents comprises creating at least 10 pseudo-documents per original document.

9. A device for training a classifying device, comprising:
   a processor; and
   a memory communicatively coupled to the processor, the memory storing:
      a sampling module to, when executed by the processor, determine a number of sub-samples in a number of original documents;
      a pseudo-document creation module to, when executed by the processor, create a number of pseudo-documents from the sub-samples, the pseudo-documents comprising a portion of the number of sub-samples, wherein each of the pseudo-documents are created by deleting a number of the sub-samples through a jack-knife statistical method; and
      a training module to, when executed by the processor, train a classifying device to classify textual documents based on the pseudo-documents.

10. The device of claim 9, further comprising a classification module to, when executed by the processor, classify a number of test documents.

11. The device of claim 10, in which the classification module classifies the test documents based on the training provided by the training module.

12. The device of claim 9, in which the processor further stores the original documents and the pseudo-documents in the memory.

13. A computer program product for classifying documents, the computer program product comprising:
   a non-transitory computer readable medium storing computer usable program code embodied therewith, the computer usable program code comprising:
      computer usable program code to, when executed by a processor, determine a number of sub-samples in a number of original documents; and
      computer usable program code to, when executed by a processor, create a number of pseudo-documents from the sub-samples, the pseudo-documents comprising a portion of the number of sub-samples,
      in which each of the pseudo-documents are created by deleting a number of the sub-samples through a jack-knife statistical method.

14. The computer program product of claim 13, in which the computer program product is operated by a third party as a service.

15. The computer program product of claim 13, further comprising computer usable program code to, when executed by a processor, train a classifying device to classify textual documents based on the pseudo-documents.

16. The computer program product of claim 13, further comprising computer usable program code to, when executed by a processor, classify a number of test documents.

* * * * *

UNITED STATES PATENT AND TRADEMARK OFFICE
CERTIFICATE OF CORRECTION

PATENT NO.        : 9,002,102 B2                                    Page 1 of 1
APPLICATION NO.   : 13/725487
DATED             : April 7, 2015
INVENTOR(S)       : Vinay Deolalikar et al.

It is certified that error appears in the above-identified patent and that said Letters Patent is hereby corrected as shown below:

On the Title Page, in item (74), Attorney, in column 2, lines 1-2, delete "Van Cott, Bagley, Comwall
    & McCarthy" and insert -- Van Cott, Bagley, Cornwall & McCarthy --, therefor.

Signed and Sealed this
Fifteenth Day of September, 2015

Michelle K. Lee
*Director of the United States Patent and Trademark Office*